US011990047B2

(12) United States Patent
Kulesh et al.

(10) Patent No.: US 11,990,047 B2
(45) Date of Patent: May 21, 2024

(54) METHOD FOR OPTIMIZING AN ARRIVAL STREAM OF AT LEAST TWO AIRCRAFT, CORRESPONDING DEVICE AND COMPUTER PROGRAM

(71) Applicant: Frequentis Orthogon GmbH, Bremen (DE)

(72) Inventors: Mikhail Kulesh, Bremen (DE); Heinrich Wernsing, Bremen (DE)

(73) Assignee: FREQUENTIS ORTHOGON GMBH, Bremen (DE)

( * ) Notice: Subject to any disclaimer, the term of this patent is extended or adjusted under 35 U.S.C. 154(b) by 280 days.

(21) Appl. No.: 17/679,759

(22) Filed: Feb. 24, 2022

(65) Prior Publication Data

US 2022/0301439 A1 Sep. 22, 2022

(30) Foreign Application Priority Data

Feb. 25, 2021 (EP) .................................... 21159380

(51) Int. Cl.
*G08G 5/00* (2006.01)

(52) U.S. Cl.
CPC ........... *G08G 5/003* (2013.01); *G08G 5/0043* (2013.01)

(58) Field of Classification Search
CPC ............................ G08G 5/003; G08G 5/0043
See application file for complete search history.

(56) References Cited

U.S. PATENT DOCUMENTS

2013/0110388 A1 5/2013 Becher et al.
2015/0081198 A1 3/2015 Garrido-Lopez et al.

FOREIGN PATENT DOCUMENTS

CN 106781708 B 7/2018
EP 1428195 B1 10/2005
WO 2017/013387 A1 1/2017

*Primary Examiner* — Mathew Franklin Gordon
(74) *Attorney, Agent, or Firm* — Seed IP Law Group LLP

(57) ABSTRACT

A method for optimizing a stream of at least two aircraft forming at least one aircraft pair, wherein each aircraft enters a predefined environment, in particular an airspace, via an individual or common entry waypoint and wherein the aircraft approach a common predefined merging waypoint, the method comprising receiving an estimated entry time for each aircraft at the at least one entry waypoint, receiving a target time for each aircraft to arrive at the merging waypoint, wherein said target time comprises a delay to be absorbed before reaching said merging waypoint, receiving routing information for each aircraft comprising waypoints for routing said aircraft from the entry waypoint to the merging waypoint, wherein the waypoints comprise at least one dedicated waypoint defining a desired minimum time based separation for each pair of aircraft, and determining optimized target arrival times, in particular target overflight times, at the one or more dedicated waypoints for the at least two aircraft utilizing an optimization model considering the estimated entry time, the target time for each aircraft to arrive at the merging waypoint and the desired minimum time based separation, wherein the optimized target arrival times are determined such that the delay to be absorbed for each aircraft is shared between route segments defined by said dedicated waypoints. According to the invention, it is proposed that the optimization model utilizes the desired minimum time based separation as a soft constraint.

19 Claims, 8 Drawing Sheets

METHOD FOR OPTIMIZING AN ARRIVAL STREAM OF AT LEAST TWO AIRCRAFT, CORRESPONDING DEVICE AND COMPUTER PROGRAM

BACKGROUND

Technical Field

The invention relates to a method for optimizing a stream of at least two aircraft forming at least one aircraft pair.

Description of the Related Art

In air traffic control (ATC) a major goal is to safely guide aircraft through the airspace, which involves ensuring a proper separation between aircraft. Ensuring a proper separation is of crucial importance to avoid any situations that may lead to near-misses or even collisions. A proper separation typically involves a certain time or distance between one aircraft succeeding another on the same or a close route.

Due to the rising number of flight movements over the last decades, ATC and air traffic management (ATM) aim at ensuring and increasing safety when guiding aircraft through the airspace but also aim at providing an efficient air transportation system with regard to the utilization of airports, fuel burn, and flight time.

When considering aircraft arrival flows towards an airport, or—more generically—a merging waypoint, to improve the number of aircraft that can utilize a merging waypoint or runway, target times can be allocated to aircraft.

The above is of particular relevance for aircraft that leave their cruising altitude, conduct a descent and finally approach a runway. Since for large airports, the runway capacity typically is one major bottleneck, so-called arrival managers are widely used in the prior art. These arrival managers calculate a target time for each aircraft to arrive at a merging point or the runway itself.

It is now one major challenge for the air traffic controller and air traffic management as such, to ensure that aircraft arrive at the merging waypoint or runway in time, since aircraft arriving at an entry waypoint of an airspace would typically not arrive at the runway at the requested time computed by the arrival manager following their optimal descent trajectory. In other words, air traffic controllers typically have to ensure that aircraft are delayed by a certain amount of time to arrive at the runway at the time computed by the arrival manager.

From the prior art, optimization models are known, for example from US 2015/0081198 A1 and EP 1 428 195 Bl. Known models typically calculate target overflight times or arrival times for dedicated waypoints defining a route of an aircraft from the entry waypoint to the merging waypoint.

These optimization models might take into consideration the estimated entry time at the entry waypoint, a desired minimum time based separation between a pair of aircraft and a target time for each aircraft to arrive at the merging waypoint.

Known optimization models, however, typically consider the desired minimum time based separation between each pair of aircraft as a hard constraint, which might generate an optimization result that might not be optimal with regard to other operational parameters. For example, the optimization results might involve a higher fuel consumption due to accelerations and decelerations, as well as the requirement for aircraft to fly so-called holding procedures, which typically increase flight time and fuel consumption.

The European Patent Office searched the following further prior art in the priority application relating to the present application: US 2013/110388 A1, CN 106781708 B and WO 2017/013387 A1.

BRIEF SUMMARY

Provided is an optimization model, which allows a more flexible optimization approach.

In one embodiment provided is a method for optimizing a stream of at least two aircraft forming at least one aircraft pair, wherein each aircraft enters a predefined environment, in particular an airspace, via an individual or common entry waypoint and wherein the aircraft approach a common predefined merging waypoint, the method comprising receiving an estimated entry time at the at least one entry waypoint, receiving a target time for each aircraft to arrive at the merging waypoint, wherein said target time comprises a delay to be absorbed before reaching said merging waypoint, receiving routing information for each aircraft comprising waypoints for routing said aircraft from the entry waypoint to the merging waypoint, wherein the waypoints comprise at least one dedicated waypoint, defining a desired minimum time based separation for each pair of aircraft, and determining optimized target arrival times, in particular target overflight times, at the one or more dedicated waypoints for the at least two aircraft utilizing an optimization model considering the estimated entry time, the target time for each aircraft to arrive at the merging waypoint and the desired minimum time based separation, such that the delay to be absorbed for each aircraft is shared between route segments defined by said dedicated waypoints.

Provided is an optimization model that utilizes the desired minimum time based separation as a soft constraint. This is based on the finding that utilizing the desired minimum time based separation as a soft constraint allows the determination of optimized target arrival times at the one or more dedicated waypoints that take into account additional optimization criteria and therefore allow for a more holistic optimization of an aircraft stream.

The entry waypoint may be a generic waypoint characterizing a certain airspace or route segment. The merging waypoint may be an enroute waypoint, at which two routes merge, but it may also be a runway of an airport.

Furthermore, provided is an operation of a flow of aircraft within an airspace. The optimization method may, however, also be utilized for optimizing a flow of aircraft performing ground taxi operations. In this regard, the waypoints may be, for example, taxiway intersections or other fixed coordinates on taxiways, aprons or runways.

According to a preferred embodiment, the merging waypoint is a destination airport. In this case, the target time for each aircraft to arrive at the merging waypoint is the target time for each aircraft arrived at the runway. This time is typically computed by an arrival manager and is considered as an input for the optimization model.

According to another preferred embodiment, the optimization model considers maximizing a time based separation between each aircraft pair at the one or more dedicated waypoints considering the desired minimum time based separation as a first optimization goal. In this way, it is ensured that a proper separation is considered within the optimization model. In other words, generally a larger separation between each pair of aircraft gives a better optimization result than a smaller separation.

According to another preferred embodiment, the time based separation is maximized only up to the predefined desired separation. This means that a better optimization result is generated when the separation is increased in a range smaller than or equal to the desired separation. Maximizing the separation to values above the predefined desired separation, however, does not further improve the optimization result. In an example, where the desired minimum time based separation is two minutes, the optimization generates better results when a separation is improved from 1 minute 30 seconds to 2 minutes, but is not further improved when the separation is increased from 2 minutes to 4 minutes, for example.

According to another preferred embodiment, the optimization model furthermore considers one or more holding procedure durations for the one or more aircraft, wherein the holding procedure durations are used to delay said aircraft, and wherein the model considers minimizing said holding procedure durations as a second optimization goal.

Holding procedures can be additionally used to delay aircraft. In case, for example, an arriving aircraft has to absorb a high delay before reaching the merging waypoint, adjusting the aircraft speed alone might not be feasible, due to flight mechanical constraints. In this case, aircraft may be advised to fly so-called holding procedures. During these holding procedures, aircraft typically circle nearby a certain holding fix and are thereby delayed to finally arrive at the merging waypoint at the required target time.

This holding procedure duration, however, should be kept to the absolute minimum, due to the involved additional flight time, fuel burn and noise emissions. Therefore, said holding procedure durations for the one or more aircraft are considered as a second optimization goal within the optimization model.

According to another preferred embodiment, said method further comprises receiving a preferred overflight time for the at least one dedicated waypoint, and wherein the optimization model furthermore minimizes a difference between the preferred overflight time and the target arrival time for the at least one dedicated waypoint as a third optimization goal. Such preferred overflight times are typically defined by air navigation service providers or flow management systems and are a further possible input to the optimization model. In this regard, it is desirable to minimize a difference between the preferred overflight time and the target arrival time for each dedicated waypoint. This forms a third optimization goal.

According to another preferred embodiment, the optimization model furthermore comprises a cost function, wherein said cost function is configured for balancing some or all of said optimization goals with respect to one another, in particular by utilizing weighting factors associated with said optimization goals.

With the help of this cost function and the weighting factors, the model allows to consider a multitude of optimization goals and a prioritization of the same. For example, ensuring a proper separation may be considered as an important optimization goal, having a high weighting factor. For another scenario, however, it might be desirable to minimize the times aircraft are required to operate in a holding procedure. In this case, for example, it might be acceptable to not reach the desired separation for every approaching flight, and, for example, to provide a vertical separation between aircraft instead. In other words, said cost function and the associated weighting factors allow for a flexible prioritization of the optimization goals as required for a certain application.

According to another preferred embodiment, the optimization model further considers maximum and minimum flight durations and/or adjusted maximum and minimum flight durations between dedicated waypoints as a further constraint. These maximum and minimum flight durations may be limited by operational constraints and flight mechanical constraints.

According to another preferred embodiment, the maximum and minimum flight durations are determined by utilizing an aircraft maximum acceleration trajectory and/or the minimum clean trajectory, in particular received from the base or aircraft data (BADA). In other words, the maximum flight time on a direct route between two waypoints is limited by the aircraft aerodynamics and flight mechanics. Given that an aircraft arrives at a certain waypoint with a certain airspeed, utilizing the maximum acceleration gives the lowest possible arrival time at the next waypoint. On the other hand, an aircraft can only be slowed down to the minimum speed considering a clean configuration of the aircraft. A clean configuration is a configuration at which the aircraft would not utilize any high-lift devices such as flaps or slats.

According to another preferred embodiment, an adjusted minimum flight duration is calculated by utilizing the determined maximum flight duration and an additional configurable time to lose, and/or wherein an adjusted minimum flight duration is calculated by utilizing the determined minimum flight duration and an additional configurable time to gain. Said time to lose and time to gain may be realized for example by requesting the aircraft to fly shortcuts, also called “direct-to”, that result in a shorter route to flown. This is an example of a time to gain.

To provide additional time to lose, air traffic controllers may utilize so-called vectoring procedures. With the help of these vectoring procedures that may be utilized in certain air spaces, aircraft may be delayed by increasing the flight distance between two dedicated waypoints, for example by requesting the aircraft to fly a non-direct trajectory between waypoints, to conduct a turn, or the like. This would be an example of a time to lose.

According to another preferred embodiment, the target arrival times at the one or more dedicated waypoints are recalculated. Such a recalculation may occur whenever the target time for an aircraft to arrive at the merging waypoint changes. In the example, in which the merging waypoint is the runway of the destination airport, a recalculation may be required in case for example the runway is blocked, traffic needs longer than anticipated to a land at the runway, or in case other traffic is delayed.

According to another preferred embodiment, target arrival times for one or more aircraft at one or more dedicated waypoints are excluded from a recalculation, in particular wherein a target arrival time associated with dedicated waypoints are excluded from a recalculation when a dedicated waypoint has already been overflown. This means in other words, that target overflight times are only recalculated for those dedicated waypoints that will still be overflown in the future. In case, for example, an aircraft has already passed two out of five dedicated waypoints, than those target overflight times will only be recalculated for the remaining three dedicated waypoints to be overflown.

According to another preferred embodiment, the optimization model considers a decrease in aircraft speed from the entry waypoint to the merging waypoint as a further constraint. This further constraint ensures that aircraft are not requested to, for example, decelerate when approaching a waypoint thereafter to accelerate again, and so on. This constraint is not only implemented for reasons of pilot and passenger comfort, but also due to reduced fuel burn and predictability for air traffic controllers and pilots.

The invention has hereinabove been described with reference to a method in a first aspect of the invention. In a second aspect, however, provided is a device for optimizing a stream of at least two aircraft forming at least one aircraft pair, wherein each aircraft enters a predefined environment, in particular an airspace, via an entry waypoint and wherein the aircraft approaches a common predefined merging waypoint, comprising a processing unit, in particular a microprocessor.

The second aspect involves a method according to the above embodiments implemented on the processing unit.

The advantages and preferred embodiments of the method of the first aspect are at the same time also advantages and preferred embodiments of the device of the second aspect. In order to avoid unnecessary repetition, reference is made to the description hereinabove.

In a further aspect, provided is a computer program prepared to perform a method according to the previous embodiments when executed on a computer.

Also with regard to this aspect, preferred embodiments and advantages of the method of the first aspect are at the same time preferred embodiments and advantages of the computer program according to the invention. In order to avoid unnecessary repetition, reference is made to the description hereinabove for that reason.

BRIEF DESCRIPTION OF THE SEVERAL VIEWS OF THE DRAWINGS

For a more complete understanding of the invention, the invention will now be described in more detail with reference to the accompanying drawings. The detailed description will illustrate and describe or is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and disclaimed hereinafter. Further, the features described in the description, the drawings and the claims disclosing the invention may be essential for the invention considered alone or in combination. In particular, any reference signs in the claims shall not be construed as limiting the scope of the invention. The word "comprising" does not exclude other elements or steps. The wording "a" or "an" does not exclude a plurality.

The invention will now be described with reference to the accompanying drawings which illustrate, one of several possible embodiments proposed herein by way of example and not by way of limitation, and wherein.

DETAILED DESCRIPTION

Figure 1:
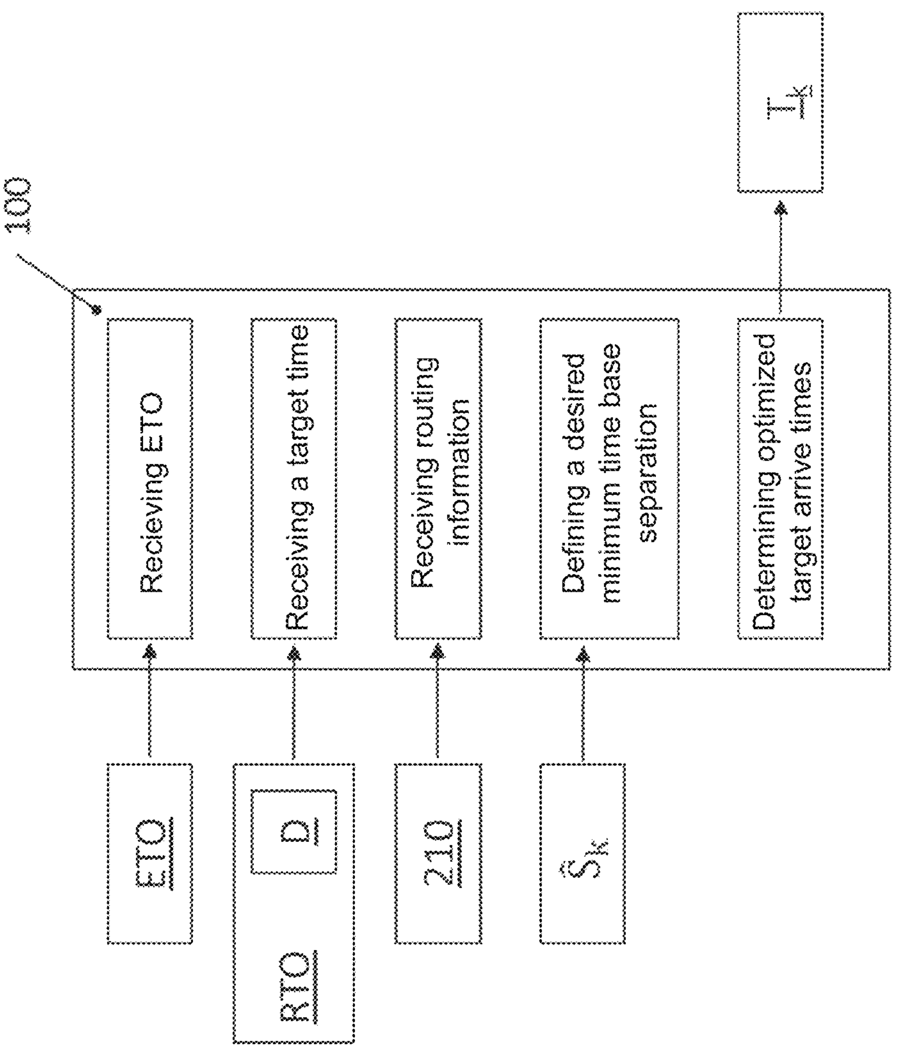
FIG. 1 shows a block diagram of an optimization method according to the concept of the invention.
Figure 2:
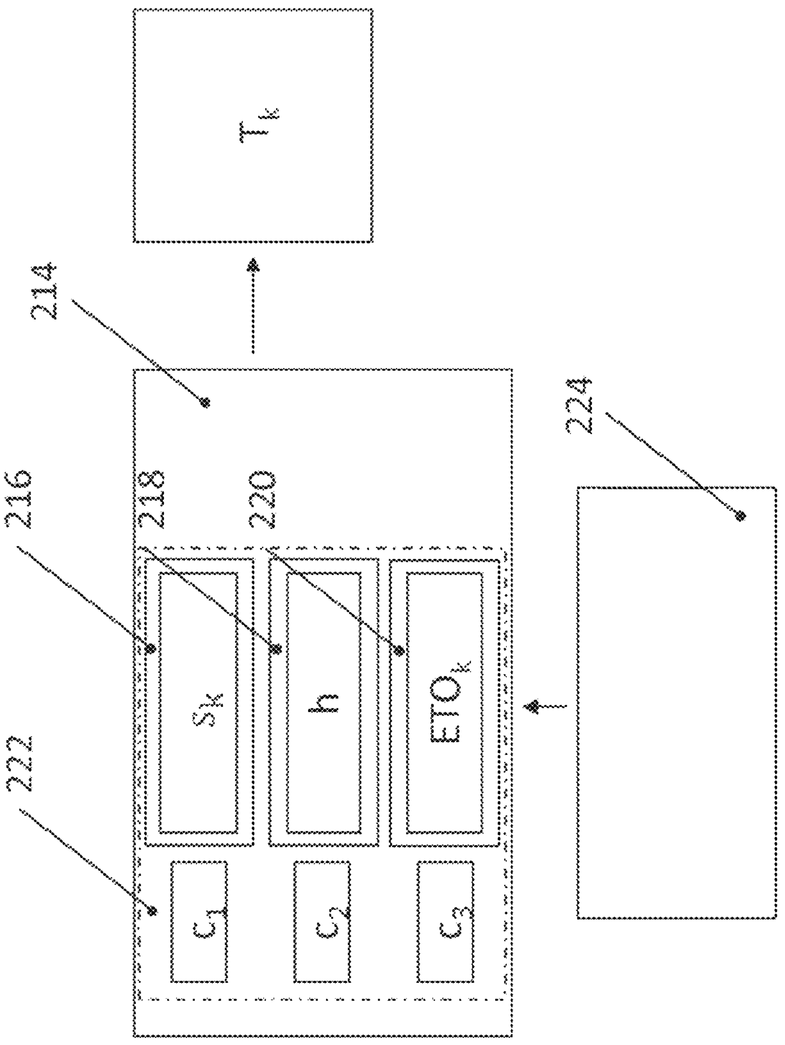
FIG. 2 shows block diagram of an optimization model according to the concept of the invention.
Figure 3:
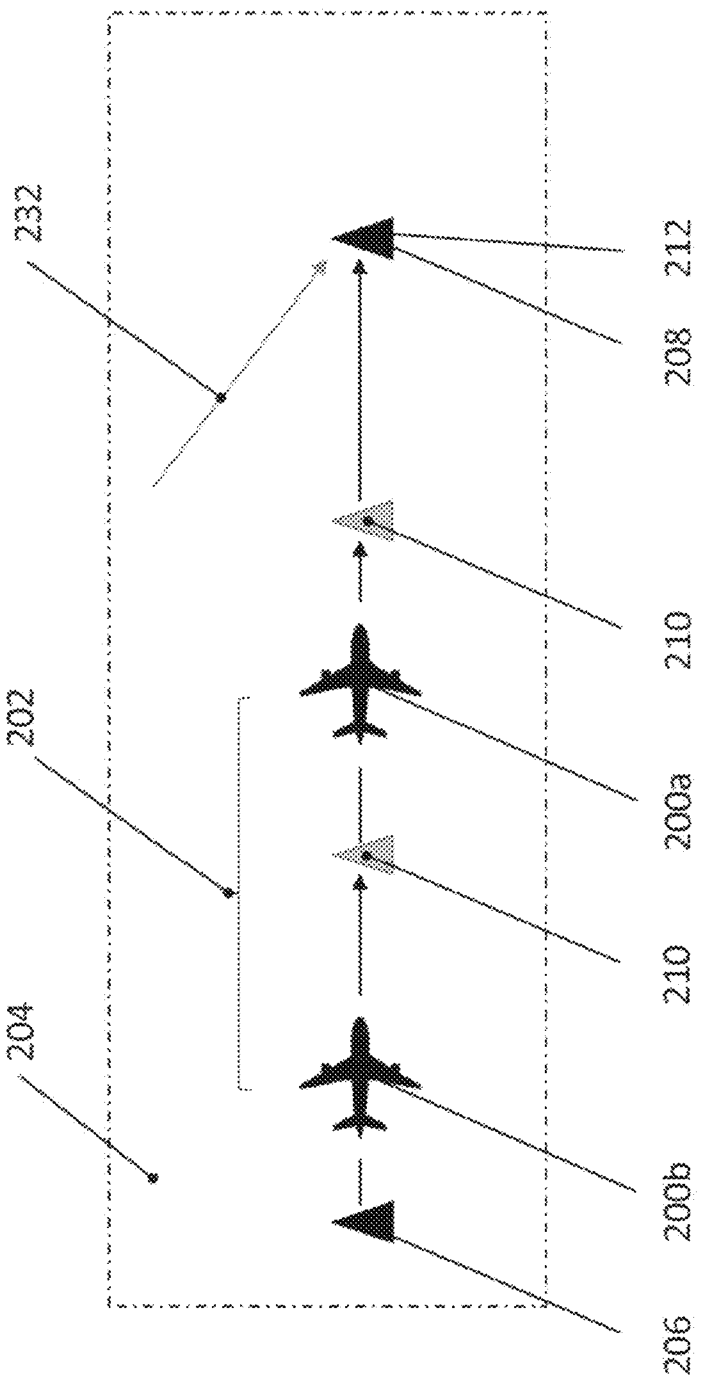
FIG. 3 shows a schematic view of a predefined environment or airspace.

FIGS. 1 to 3 illustrate a method 100 for optimizing a stream of at least two aircraft 200*a*, 200*b*. In this regard, FIG. 1 shows a block diagram of said method 100 itself, FIG. 2 shows a block diagram of an optimization model 214, and FIG. 3 shows a corresponding simplified airspace structure 204.

According to FIG. 3, a stream of at least two aircraft 200*a*, 200*b* forms at least one aircraft pair 202. FIG. 3 shows a stream of two aircraft 200*a*, 200*b*, said stream however may comprise a larger number of aircraft 200 that form different pairs 202. Each aircraft 200*a*, 200*b* enters a predefined environment or airspace 204 via an entry waypoint 206. From this entry waypoint 206, the aircraft 200*a*, 200*b* approach a common predefined merging waypoint 208. Between the entry waypoint 206 and the merging waypoint 208, enroute waypoints 210 are arranged. These enroute waypoints 210 comprise dedicated waypoints 210. Aircraft 200*a*, 200*b* proceed from the entry waypoint 206 via the enroute waypoints 210 to the merging waypoint 208. A further arrival stream 232 might lead to the merging waypoint 208. The merging waypoint 208 might also be the destination airport 212, in particular, a threshold of a runway of said destination airport 212, on which the aircraft 200*a*, 200*b* are intended to land.

Turning now to said optimization method 100 as explained in FIG. 1, said method 100 comprises the following steps: Receiving 102 an estimated entry time ETO for each aircraft 200*a*, 200*b* at the at least one entry waypoint 206, receiving, according to step 104, a target time for each aircraft 200*a*, 200*b* to arrive at the merging waypoint 208, which is the requested time over the merging waypoint (RTO), wherein said target time RTO comprises a delay D to be absorbed before reaching such merging waypoint 208.

Furthermore, according to step 106, routing information are received for each aircraft 200*a*, 200*b*. These routing information comprise waypoints 210 for routing said aircraft 200*a*, 200*b* from the entry waypoint 206 to merging waypoint 208 as shown in FIG. 3. Furthermore, according to step 108, a desired minimum time based separation $\hat{S}_k$ for each pair of aircraft 202 is defined.

According to step 110, optimized target arrival times $T_k$, in particular target overflight times $T_k$, at the one or more dedicated waypoints 210 for the at least two aircraft 200*a*, 200*b* utilizing an optimization model 214 are determined. Said optimization model 214 considers the estimated entry time (ETO), the target time for each aircraft to arrive at the merging waypoint (RTO) and the desired minimum time based separation $\hat{S}_k$. The optimized target arrival times $T_k$ are determined such that the delay D to be absorbed for each aircraft 200*a*, 200*b* is shared between route segments defined by said dedicated waypoints 210. This delay sharing will be illustrated later on with regard to FIGS. 4 and 5. The optimization model 214 utilizes the desired minimum time based separation $\hat{S}_k$ as a soft constraint, as shown in FIG. 2.

The optimization model 214 is detailed in FIG. 2. The optimization model comprises a cost function 222. The cost function 222 is configured for balancing optimization goals 216, 218, 220 with respect to one another. For balancing those optimization goals 216, 218, 220 weighting factors $c_1$, $c_2$, $c_3$ are associated with said optimization goals 216, 218, 220. According to the first optimization goal 216, the optimization model 214 considers maximizing a time based separation $s_k$ between each aircraft pair 202 at the one or more dedicated waypoints 210 considering the desired minimum time based separation $\hat{S}_k$. As already explained, said time based separation $s_k$ is utilized as a soft constraint.

The time based separation skis maximized only up to the predefined desired separation $\hat{S}_k$. In other words, this means, that whenever the desired separation $\hat{S}_k$ is reached in the optimization solution, the solution would not get any better for separations higher than the desired minimum separation $\hat{S}_k$. As the second optimization goal 218, the optimization model 214 furthermore considers one or more holding procedure durations h for the one or more aircraft 200*a*, 200*b*. These holding procedure durations h and holding procedures as such are used to delay said aircraft 200*a*, 200*b*, for example with the help of a so-called holding patterns. At holding patterns, aircraft 200*a*, 200*b* typically circle nearby a certain waypoint utilizing a standard procedure. The optimization model 214 considers minimizing the holding procedure durations h as a second optimization goal 218.

Optionally, the method 100 furthermore comprises receiving a preferred overflight time $ETO_k$ for the at least one dedicated waypoint 210. These preferred overflight times $ETO_k$ might be generated by external sources. As a potential third optimization goal 220, the minimization of the difference between preferred overflight time $ETO_k$ and target arrival time $T_k$ at a certain dedicated waypoint 210 is considered.

The optimization model 214 might further consider maximum and minimum flight durations and/or adjusted maximum and minimum flight durations between dedicated waypoints 210 as a further constraint 224. These maximum and minimum flight durations are determined by utilizing aircraft 200*a*, 200*b* maximum acceleration trajectory and/or a minimum clean trajectory, in particular received from the base of aircraft data (BADA). An adjusted maximum flight duration might be calculated by utilizing the determined maximum flight duration and an additional configurable time to lose and/or an adjusted minimum flight duration may be calculated by utilizing the determined minimum flight duration and an additional configurable time to gain.

Furthermore, the target arrival times $T_k$ at the one or more dedicated waypoints 210 may be recalculated. In particular, target arrival times for one or more aircraft 200*a*, 200*b* at one or more dedicated waypoints 210 are excluded from a recalculation. This might be especially beneficial, when target arrival times $T_k$ associated with dedicated waypoints 210 have already been overflown. In addition, the optimization model 214 might consider a decrease in aircraft speed from the entry waypoint to the merging waypoint as a further constraint 224.

Figure 4:
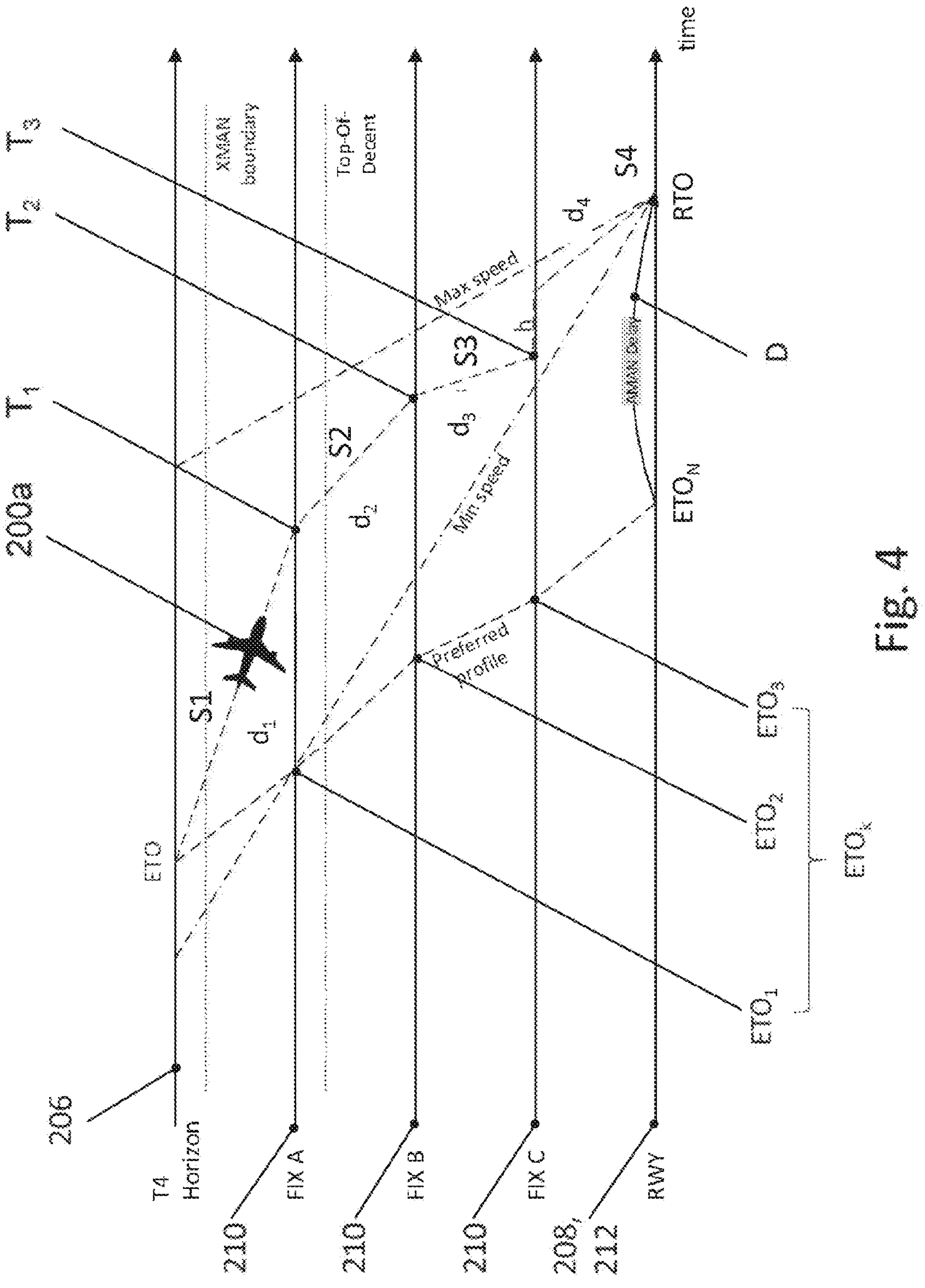
FIGS. 4, 5 show examples of approach trajectories of one or two aircraft.

A vertical approach profile of an aircraft 200*a* approaching an entry waypoint 206 and thereafter a merging waypoint 208 via dedicated enroute waypoints 210 is shown in FIG. 4. FIG. 4 also explains the basic concept of the Streaming optimization algorithm. The optimization model 100 calculates or determines target overflight times $T_k$ at the dedicated waypoints 210. When an aircraft 200*a* enters the entry waypoint 206 at the estimated entry time ETO, then the optimization method 100 will calculate the optimized target overflight times $T_k$ at the dedicated waypoints 210.

In the scenario shown in FIG. 4, both, the estimated entry time ETO at the entry waypoint 206 and the target time to arrive at the merging waypoint 208, which is a destination airport 212 in this example, are provided to the optimization method 100. Due to the additional delay D to be absorbed, the aircraft 200*a* arriving at the entry waypoint 206 at the estimated entry time ETO cannot utilize its preferred profile defined by preferred overflight times $ETO_k$ ($ETO_{1-3}$ in FIG. 4) at the dedicated waypoints 210 to approach the destination airport 212. If the aircraft 200*a* would do so, this would result in arriving at the destination airport 212 well before the target time RTO to arrive at the merging waypoint 208 which is, in this case, equal to a target landing time (TLDT). Rather, the aircraft would arrive at the merging waypoint 208 at an estimated time $ETO_N$, which is unwanted.

In other words, the aircraft 200*a* has to divert from its preferred profile in order to absorb the delay D between the entry waypoint 206 and the merging or destination waypoint/airport 208, 212. This delay D to be absorbed is now “shared” between different enroute segments ($d_1$, $d_2$, $d_3$, $d_4$) between the dedicated waypoints 210. The shown max speed and min speed are examples of constraints 224 to be considered. As can be obtained from FIG. 4, not only variations in speed of the aircraft 200*a* may be utilized to delay said aircraft 200*a*, but also additional holding procedure durations h.

Figure 5:
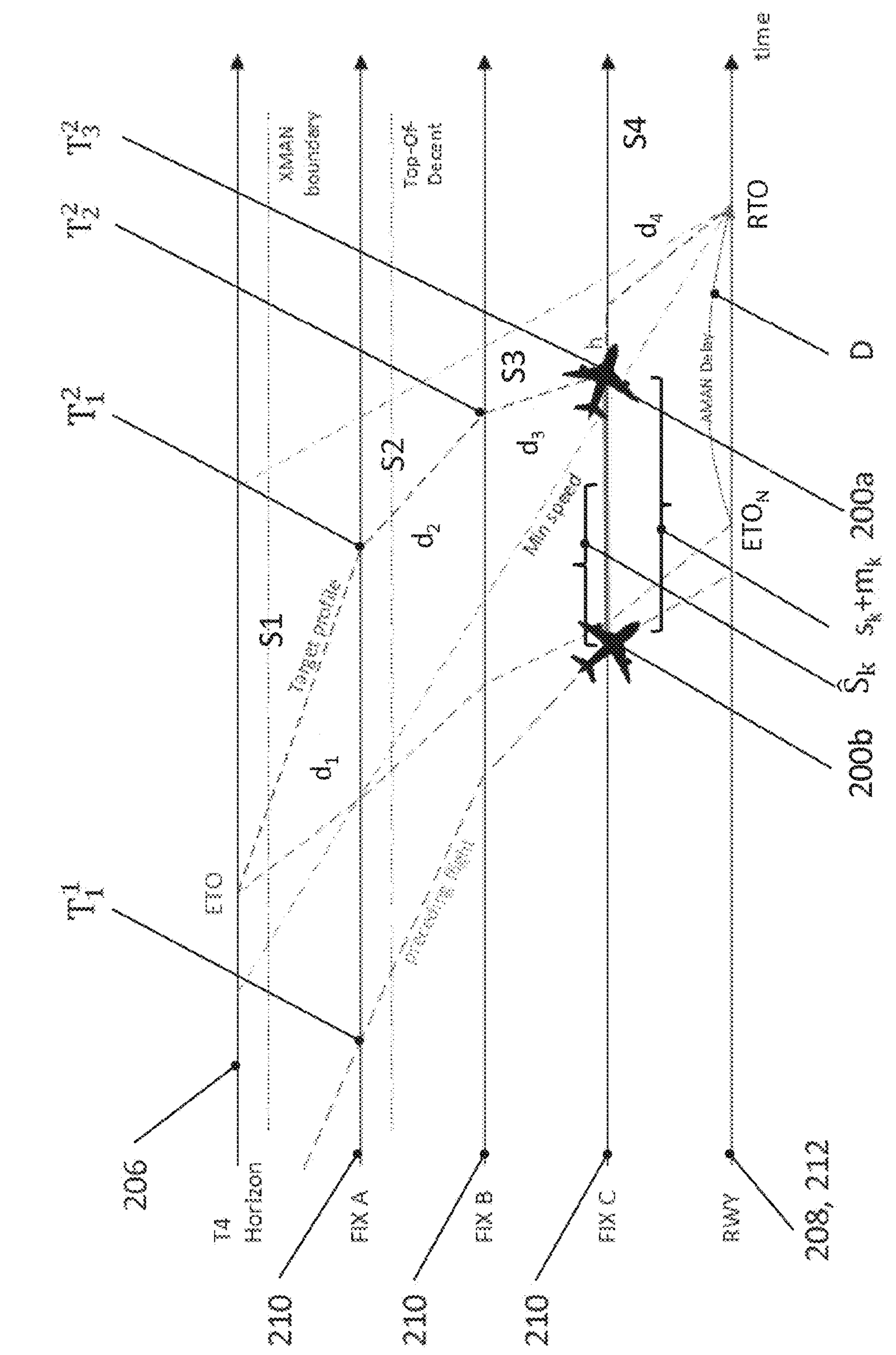

FIG. 5 shows the same scenario for aircraft 200*a*, but also considers a preceding flight of an aircraft 200*b*. The time based separation $s_k$ is optimized as already explained. In the example shown, the optimized time based separation $s_k$ is equal to the desired minimum time based separation $\hat{S}_k$. Furthermore, an additional “natural gap” $m_k$ is present between said aircraft 200*a* and 200*b*.

The optimization model 100 calculates or determines target overflight times $T_k^f$ at the dedicated waypoints 210, wherein the variable f characterizes the aircraft. For the aircraft 200*a* shown in the right of the figure, the notation $T_k^2$ is utilized. For the preceding aircraft 200*b* $T_k^1$ is used. The superscript f is used herein to distinguish between aircraft in general. However, the superscript has not been used in the description and the figures continuously to improve readability.

Figure 6:
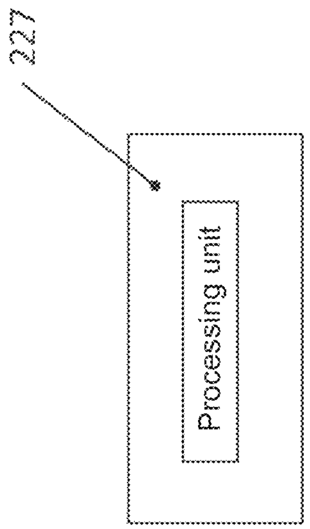
FIG. 6 shows a device according to the concept of the invention.

FIG. 6 shows a device 227 for optimizing a stream of at least two aircraft 200*a*, 200*b* forming at least one aircraft pair 202. The device 227 comprises a processing unit 228, which might be a microprocessor 228. The method 100, as described herein, is implemented on the processing unit 228.

Figure 7:
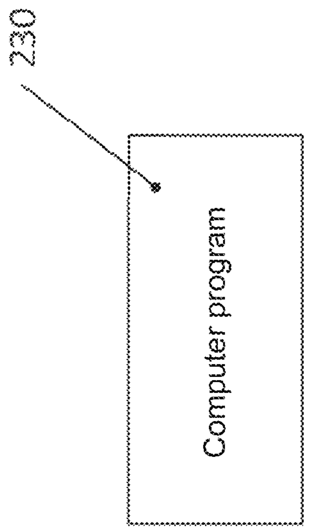
FIG. 7 shows a computer program according to the concept of the invention.

FIG. 7 shows a computer program 230. The computer program 230 is prepared to perform the method 100 according to the embodiments described herein.

Figure 8:
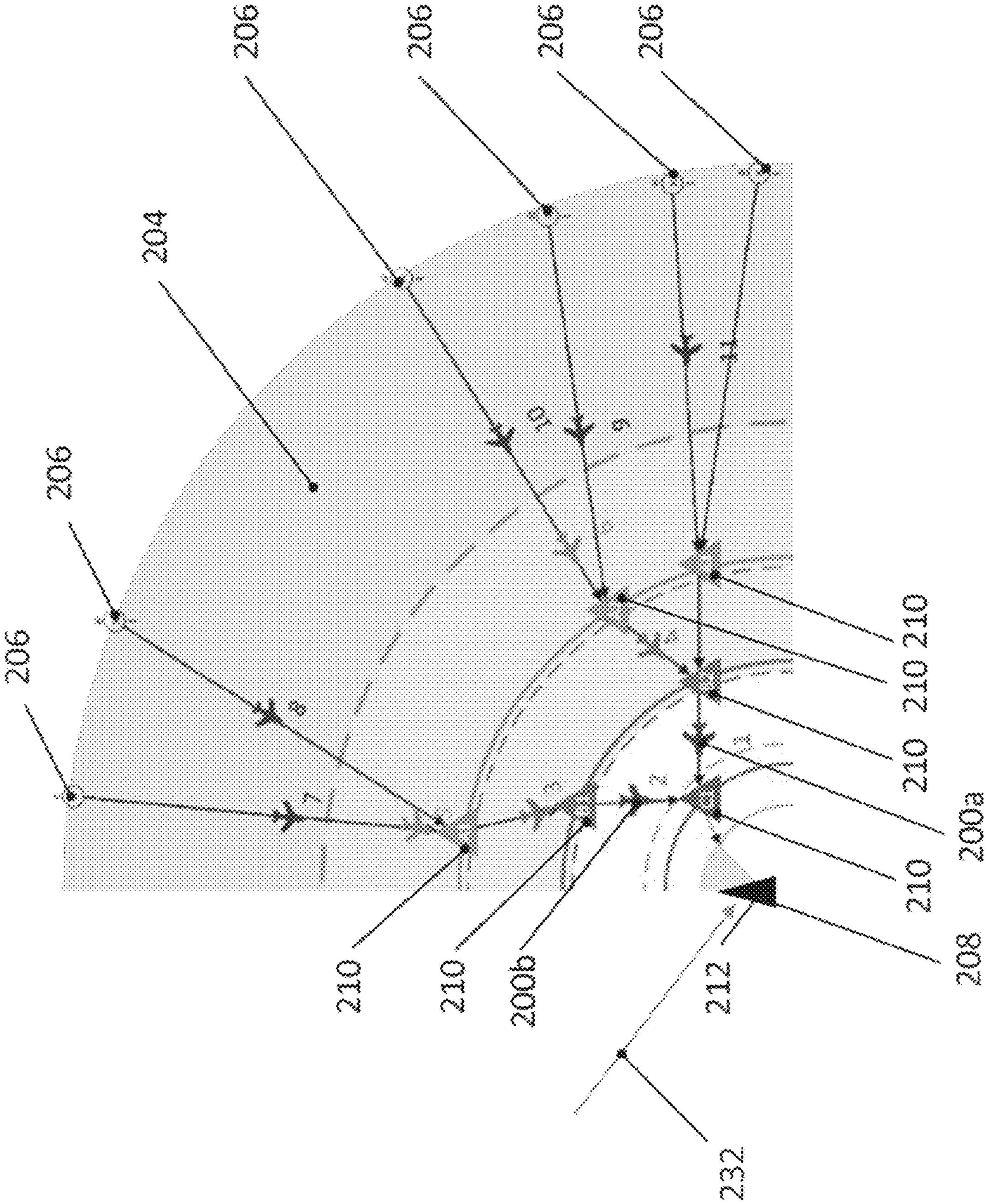
FIG. 8 shows an alternative embodiment of an airspace according to the concept of the invention.

FIG. 8 shows an alternative embodiment of an airspace 204. Said airspace 204 comprises all elements shown in FIG. 3, but comprises a more complex structure of waypoints 206, 208, 210.

In particular, aircraft 200 may enter the airspace 204 via a multitude of entry waypoints 206. Waypoints 210 guide the aircraft from the entry waypoint 206 to a merging waypoint 208. This merging waypoint 208 is a common waypoint for all different arrival routes. Again, the merging waypoint 208 may be the destination airport 212, or lead to the destination airport 212, as shown in FIG. 8. Optionally, further arrival streams 232 may lead to the destination airport 212. In this case, for the optimization method 100, the destination airport would be considered as the merging waypoint 208 for the optimization. Optionally, the airspace 204 may also comprise additional arrival streams (not shown). The optimization method 100 is also capable of providing optimized overflight times $T_k$ for such a scenario.

In the following, the optimization method 100 will be described and explained utilizing mathematical formulations. Some of the explanations to follow make reference to FIG. 4. The formulas also include explanations regarding the conditions and rules to be considered. It is also noted that the claims and previous embodiments may use simplified formula or simplified variable expressions or parameters for illustrative purposes. In other words the formulas and expressions explained below may be different to some formulas or expressions used previously herein but still explain the same thing.

To begin with, the following definitions are given:

A Target profile (line comprising the aircraft 200*a* in FIG. 4) is the output profile where runway delay shall be fully absorbed using individual speeds for every route segment, target holding duration at holding point.

T4 is the entry waypoint. FIX A, FIX B, and FIX C (dedicated waypoints 210 in FIG. 4) are waypoints along the target profile. The Streaming optimization algorithm shall issue target times for all these points. The desired separation between flights on these points is a configuration parameter. If the desired separation cannot be achieved by the Streaming optimization algorithm, flights shall be separated manually by the controller using different flight levels.

FIX C is a holding point where a part of the runway delay can be absorbed. The variable h defines the holding duration. Holding entry time and holding exit time are target times that are calculated by the Streaming optimization algorithm. There is no restriction on the holding duration value.

The variable $d_1$ is the flight duration on the segment T4-A, $d_2$ is the duration for segment A-B, $d_3$ for B-C and d for C-RWY. The five durations ($d_1$-$d_4$ and h) are unknown variables that will be found by the Streaming optimization algorithm via an optimization problem described below.

For the formulation of a mathematical model, the following notations are used:

N is the number of segments (route segments between dedicated waypoints, including runway), subscript k is the index of a dedicated waypoint. For every segment, its length is known and notated as $L_k$.

The speed of an individual flight shall not increase in succeeding segments, i.e., the speed on route segment S3 must be less or equal to the speed on route segment S2.

M is the number of flights. Superscripts f and p are the indices of two flights.

$ETO^f$ is the estimated overflight time of flight f on the entry waypoint, and $ETO_k^f$ is the preferred overflight time of flight f over the dedicated waypoint k, all given externally, for instance given by ETFMS or calculated using BADA model.

[$ETO_{min,k}^f$, $ETO_{max,k}^f$] are the earliest ETO and the latest ETO. Both can be given externally, for instance calculated using maximum acceleration trajectory and minimum clean trajectory from the base of aircraft data (BADA) model. Alternatively, earliest and latest ETO can be defined by a configurable time to loose per route segment $TTL_k$ and time to gain per route segment $TTG_k$:

$$ETO_{min,k}^f = ETO_k^f - \sum_{n=1}^{k} TTG_n$$

$$ETO_{max,k}^f = ETO_k^f - \sum_{n=1}^{k} TTL_n,\ 1 \le k < N$$

$RTO^f$ is the target landing time for flight f to arrive at the RWY, $ETO_N^f$ is the estimated landing time based on preferred landing profile, both given externally. The runway delay of a flight is given by $D=RTO^f-ETO_N^f$ and shall be fully absorbed by the Streaming optimization algorithm.

$T_k^f$ is the target overflight time for flight fat point k. This is an unknown variable that will be found by the Streaming optimization algorithm.

$\tilde{T}_k^f$ is the issued target time for flight f and point k. It is optionally given by external systems. When given, the target time, the dedicated waypoint respectively, for this flight is called frozen and the target time will be no more changed by the Streaming optimization algorithm. Typically a point will be frozen, when either the previously calculated target time or the actual time over this dedicated waypoint is in the past.

Additionally the following assumptions are made:

It is assumed that the order of flights on all points is known and given externally.

No overtaking between the flights will take place along the different route segments.

The following variables are introduced:

$d_k^f$, k=1 . . . N is the target flight duration of flight f for segment k.

$s_k^f$ is the separation term that represents the part of the separation to the preceding flight at dedicated waypoint k that will be optimized.

$m_k^f$ is a free variable representing an additional optional separation that covers a "natural gap" between two flights.

$h^f$ is the holding duration for flight f.

Additionally, there are some variables that depend on the state of the flight and can be defined before the algorithm is run:

The initial time of the flight is the estimated overflight time $ETO^f$ of the entry waypoint. If the entry waypoint is frozen the initial time is set to the issued target time over the entry waypoint:

$ETO^f=\tilde{T}_0^f$ if the entry point is frozen.

Additionally, if there are further frozen points, which is the case if there exist further issued target times $\tilde{T}_k^f$, the target times and all other times for these frozen points will be fixed and the target times will be no longer optimized:

$T_k^f=ETO_k^f=ETO_{min,k}^f=ETO_{max,k}^f=\tilde{T}_k^f$ for all k where $\tilde{T}_k^f$ is given.

With the aid of the defined variables, we can couple the target time $T_k^f$ for flight f over dedicated waypoint k together with the flight specific durations, as follows:

$$T_k^f = ETO^f + \sum_{n=1}^{k} d_n^f,\ 1 \le k < N$$

$$T_k^f = ETO^f + h^f + \sum_{n=1}^{N} d_n^f,$$

where $T_N^f$ is the landing time that is calculated with respect to the holding duration and must meet the externally given target landing time (RTO).

The following set of constraints is applied to considered variables. These constraints ensure that every flight absorbs whole delay along the route, has a "physically" possible decent profile, and the actual distance between flights on every point is covered by optimized and optional separation terms:

The optimization algorithm does not use the speed of the aircraft directly, but uses the durations between two dedicated waypoints. The minimum and maximum durations $D_{min,k}^f$, $D_{max,k}^f$ are calculated with the externally given ETOs:

$$D_{min,k}^f=ETO_{min,k}^f-ETO_{min,k-1}^f,$$

$$D_{max,k}^f=ETO_{max,k}^f-ETO_{max,k-1}^f.$$

The flight duration for every segment is limited by minimum and maximum durations:

$$d_k^f\in[D_{min,k}^f,D_{max,k}^f],k\geq 1$$

For every flight and every dedicated waypoint, we calculate minimum and maximum target times $[T_{min,k}^f, T_{max,k}^f]$ starting from the entry waypoint:

$$T_{min,k}^f = ETO^f + \sum_{n=1}^{k} D_{min,n}^f,\ 1 \leq k \leq N$$

$$T_{max,k}^f = ETO^f + \sum_{n=1}^{k} D_{max,n}^f,\ 1 \leq k \leq N-2$$

$$T_{max,k}^f = \infty,\ N-1 \leq k \leq N$$

In case a flight got an issued target time that leads to a situation where the target landing time (RTO) is earlier than the minimum landing time $RTO^f<T_{min,N}^f$ the RTO will be set to the minimum landing time: $RTO^f=T_{min,N}^f$.

The target flight duration is constrained by the difference between RTO and ETO; i.e., whole runway delay shall be absorbed within the remaining route after the last frozen point: $T_N^f=RTO^f$ or, alternatively, $$ETO^f + h^f + \sum_{n=1}^{N} d_n^f = RTO^f$$

Based on configuration, the flight speed for some segments shall be less or equal than the speed in the previous segment:

$$\frac{L_k}{d_k^f} \leq \frac{L_{k-1}}{d_{k-1}^f},\ k \geq 2$$

This constraint can only be applied if $$\frac{L_k}{D_{max,k}^f} \leq \frac{L_{k-1}}{D_{max,k-1}^f}.$$

If this condition is not satisfied for a certain dedicated waypoint k, the corresponding speed constraint will be omitted.

The actual separation between flights (f is successor, p is predecessor) is a sum of optimized separation $s_k^f$ and optional separation $m_k^f$ related to the flight f. The term $m_k^f$ is greater than zero only if the distance between flights is greater than the desired separation, i.e., if a "natural gap" exists. For aircraft on the same routes target times are required to ensure time separation is maintained throughout:

$$T_k^f-T_k^p=s_k^f+m_k^f,1\leq k<N$$

$$m_k^f\geq 0$$

This constraint shall only be applied if minimum and maximum target times allow the required order for these flights: $T_{max,k}^f>T_{min,k}^p$ The separation $s_k^f$ shall only be optimized up to a desired minimum separation $\hat{S}_k$. Therefore, the optimized separation is constrained by:

$$s_k^f\in[0,\hat{S}_k],$$

where $\hat{S}_k$ is the desired minimum separation at dedicated waypoint k.

In case a flight got an issued target time that leads to an overtaking situation with another flight, the separation constraint cannot be satisfied any longer. In that case the corresponding constraint will be omitted.

The following cost function is utilized:

Primary Optimization Goal—Find target times for the dedicated waypoints to sequence arrivals on all route points so that least use of vertical separation is required, i.e., as many flights as possible are time separated though the airspace. In order to achieve this, we maximize the separation up to the desired minimum separation for every flight f:

$$\sum_{n=1}^{N} (\hat{S}_n - s_n^f) \to \min$$

Secondary Optimization Goal—The holding durations shall be minimized and the holding delay shall be moved to route segments:

$$\sum_{j=1}^{M} h^j \to \min$$

Third Optimization Goal—To retain a natural gap between two flights the target times for every flight and dedicated waypoint shall be pushed in the direction of the preferred ETO by minimizing:

$$\sum_{n=1}^{N} \left|ETO_n^f - T_n^f\right| \to \min$$

We can then couple all these minimization terms using weighting factors $c_1$, $c_2$, $c_3\geq 0$:

$$c_1\sum_{j=1}^{M}\sum_{n=1}^{N} P_n(\hat{S}_n - s_n^j) + c_2\sum_{j=1}^{M} h^j + c_3\sum_{j=1}^{M}\sum_{n=1}^{N}\left|ERO_n^j - T_n^j\right| \to \min$$

where $P_n$ is a configured individual penalty factor for every dedicated waypoint. Here $c_1>>c_2$ guarantees that the separation is maximized with higher priority compared to retaining the natural gap.

The project leading to this application has received funding from the SESAR Joint Undertaking (JU) under grant agreement Np [872085—PJ01-W2 EAD]. The JU receives support from the European Union's Horizon 2020 research and innovation program and the SESAR JU members other than the Union.

LIST OF REFERENCES

100 optimization method
102 receiving an estimated entry time at the at least one entry waypoint
104 receiving a target time for each aircraft to arrive at the merging waypoint
106 receiving routing information for each aircraft
108 defining a desired minimum time based separation for each pair of aircraft
110 determining optimized target arrival times at the dedicated waypoints
200*a*, 200*b* aircraft
202 aircraft pair
204 predefined environment/airspace
206 entry waypoint
208 merging waypoint
210 dedicated waypoints
212 destination airport
214 optimization model
216 first optimization goal
218 second optimization goal
220 third optimization goal
222 cost function
224 constraint
227 device
228 processing unit/microprocessor
230 computer program
232 further arrival stream
BADA base of aircraft data
D delay to be absorbed
ETO estimated overflight time at entry waypoint
$ETO_k$ preferred overflight time at a certain dedicated waypoint k
$ETO_N$ estimated time to arrive at the merging waypoint
RTO target time to arrive at the merging waypoint (requested time over merging waypoint)
$c_1$, $c_2$, $c_3$ weighting factors
h holding procedure durations
$\hat{S}_k$ desired minimum time based separation for each pair of aircraft at a certain dedicated waypoint k
$T_k$ optimized target arrival/overflight time at a certain dedicated waypoint k
$s_k$ optimized time based separation between an aircraft pair at a certain dedicated waypoint k
$m_k$ natural gap between pair of aircraft
$d_1$-$d_n$ Flight durations between dedicated waypoints The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for optimizing a stream of at least two aircraft forming at least one aircraft pair, wherein each aircraft enters a predefined airspace, via an individual or common entry waypoint, and wherein each aircraft approach a common predefined merging waypoint, the method comprising:

receiving an estimated entry time for each aircraft at the individual or common entry waypoint, receiving a target time for each aircraft to arrive at the common predefined merging waypoint, wherein said target time comprises a delay to be absorbed before reaching the common predefined merging waypoint, receiving routing information for each aircraft comprising waypoints for routing said respective aircraft from the individual or common entry waypoint to the common predefined merging waypoint, wherein the waypoints comprise one or more dedicated waypoints, defining a desired minimum time based separation for each pair of aircraft from each other, and determining optimized target arrival times at the one or more dedicated waypoint for the at least two aircraft utilizing an optimization model considering the estimated entry time, the target time for each aircraft to arrive at the common predefined merging waypoint, and the desired minimum time based separation, wherein the optimized target arrival times are determined such that the delay to be absorbed for each aircraft is shared between route segments defined by the one or more dedicated waypoints, wherein the optimization model utilizes the desired minimum time based separation as a soft constraint.

2. The method according to claim 1, wherein the common predefined merging waypoint is a destination airport.

3. The method according to claim 1, wherein the optimization model considers maximizing a time based separation between each aircraft pair at the one or more dedicated waypoints considering the desired minimum time based separation as a first optimization goal.

4. The method according to claim 3, wherein the time based separation is maximized only up to a predefined desired separation.

5. The method according to claim 3, wherein the optimization model further considers one or more holding procedure durations for the at least two aircraft, wherein the holding procedure durations are used to delay said aircraft, and wherein the optimization model considers minimizing said holding procedure durations as a second optimization goal.

6. The method according to claim 4, further comprising receiving a preferred overflight time for the at least one dedicated waypoint, and wherein the optimization model further considers a minimization of a difference between the preferred overflight time and the target arrival time at a certain dedicated waypoint as a third optimization goal.

7. The method according to claim 1, wherein the optimization model further comprises a cost function, wherein the cost function is configured to balance two or more of the first, second, or third optimization goals with respect to one another.

8. The method according to claim 1, wherein the cost function is configured to balance the two or more of the first, second, or third optimization goals with respect to one another by utilizing weighting factors associated with the first, second, or third optimization goals.

9. The method according to claim 1, wherein the optimization model further considers maximum and minimum flight durations and/or adjusted maximum and minimum flight durations between dedicated waypoints as a further constraint.

10. The method according to claim 9, wherein the maximum and minimum flight durations are determined by utilizing an aircraft's maximum acceleration trajectory and/or a minimum clean trajectory.

11. The method according to claim 10, wherein the aircraft's maximum acceleration trajectory and/or a minimum clean trajectory is received from a base of aircraft data (BADA).

12. The method according to claim 9, wherein an adjusted maximum flight duration is calculated by utilizing the determined maximum flight duration and an additional configurable time to lose, and/or wherein an adjusted minimum flight duration is calculated by utilizing the determined minimum flight duration and an additional configurable time to gain.

13. The method according to claim 1, wherein the target arrival times at the one or more dedicated waypoints are recalculated.

14. The method according to claim 11, wherein target arrival times for one or both aircraft at one or more dedicated waypoints are excluded from a recalculation.

15. The method according to claim 14, wherein target arrival times associated with dedicated waypoints are excluded from a recalculation when a dedicated waypoint has already been overflown.

16. The method according to claim 1, wherein the optimization model considers a decrease in aircraft speed from the entry waypoint to the common predefined merging waypoint as a further constraint.

17. The method according to claim 1, wherein the optimized target arrival times are target overflight times.

18. A device for optimizing a stream of at least two aircraft forming at least one aircraft pair, wherein each aircraft enters a predefined environment in an airspace via an entry waypoint, and wherein the aircraft approach a common predefined merging waypoint, comprising a processing unit, wherein the method according to claim 1 is implemented by the processing unit.

19. A computer program prepared to perform a method according to claim 1 when executed on a computer.

* * * * *